United States Patent
Takahashi et al.

(10) Patent No.: US 7,189,766 B2
(45) Date of Patent: Mar. 13, 2007

(54) INK FOR PRINTING, PRINTED MATTER, PRINTING METHOD AND PRINTER

(75) Inventors: Masashi Takahashi, Tokyo (JP); Yoshie Arai, Tokyo (JP); Masayoshi Onishi, Otokuni-gun (JP); Hiroshi Okubo, Otokuni-gun (JP); Yoshinari Yasuda, Otokuni-gun (JP)

(73) Assignees: Toppan Printing Co., Ltd., Tokyo (JP); Maxell Seiki, Ltd., Kyoto (JP)

( * ) Notice: Subject to any disclaimer, the term of this patent is extended or adjusted under 35 U.S.C. 154(b) by 235 days.

(21) Appl. No.: 10/432,780

(22) PCT Filed: Nov. 28, 2001

(86) PCT No.: PCT/JP01/10384
§ 371 (c)(1),
(2), (4) Date: May 27, 2003

(87) PCT Pub. No.: WO02/44288
PCT Pub. Date: Jun. 6, 2002

(65) Prior Publication Data
US 2004/0054030 A1    Mar. 18, 2004

(30) Foreign Application Priority Data
Nov. 30, 2000    (JP)    .............................. 2000-365300

(51) Int. Cl.
C08F 2/46 (2006.01)
C09D 11/02 (2006.01)
C09D 11/00 (2006.01)

(52) U.S. Cl. ............................. 522/84; 522/71; 522/83; 522/96; 522/100; 522/104; 522/90; 522/103; 522/107; 522/170; 522/173; 522/174; 522/182; 522/178; 523/161; 523/162; 106/31.13

(58) Field of Classification Search .................. 522/96, 522/100, 104, 103, 71, 83, 84, 170, 173, 522/174, 178, 182, 107; 523/161, 162, 160; 106/31.13
See application file for complete search history.

(56) References Cited

U.S. PATENT DOCUMENTS

| | | | |
|---|---|---|---|
| 3,952,032 A | | 4/1976 | Vrancken et al. |
| 4,270,985 A | * | 6/1981 | Lipson et al. ................ 205/135 |
| 5,006,407 A | * | 4/1991 | Malhotra ................ 428/32.14 |

FOREIGN PATENT DOCUMENTS

| | | |
|---|---|---|
| GB | 2 338 212 | 12/1999 |
| JP | 6-91946 | 4/1994 |
| JP | 10-315630 | 12/1998 |
| JP | 2000-37943 | 2/2000 |
| JP | 2000-53714 | 2/2000 |
| JP | 2000-319566 | 11/2000 |
| JP | 2000-354805 | 12/2000 |
| WO | WO 97/04964 | 2/1997 |
| WO | WO 00/50245 | 8/2000 |
| WO | WO 01/17780 A1 | 3/2001 |

OTHER PUBLICATIONS jp 2000/053714—Rough Machine Translation.*

* cited by examiner

Primary Examiner—Sanza L. McClendon

(57) ABSTRACT

The printing ink of the present invention is characterized by containing a photo-curable high polymer precursor, and a photopolymerization initiator, and containing 3 to 8 parts by weight of inorganic fine particles having a mean particle size of 0.1 μm or less to 100 parts by weight of the high polymer precursor. Moreover, the printing ink of the present invention is characterized by having a viscosity at a shear rate of 5 (1/s) of 8 to 75 (Pa·s), a viscosity at a shear rate of 20 (1/s) of 3 to 25 (Pa·s), and a thixotropic index value of 1.5 to 3.5. As a result of using this printing ink, letters, figures, symbols, graphics, etc., having a thickness of 0.2 mm or more can be printed rapidly without affecting the printed base material. In addition, as a result of using the printing ink of the present invention, a printed matter of the present invention can be provided that is characterized by the printing ink of the present invention being printed onto the surface of the printed base material followed by curing. In particular, the present invention is preferable for obtaining a Braille printed matter, and the Braille printed matter in which Braille characters are printed on the surface can be provided by printing the printing ink of the present invention onto the surface of the printed base material in the form of dots followed by curing.

8 Claims, 3 Drawing Sheets

INK FOR PRINTING, PRINTED MATTER, PRINTING METHOD AND PRINTER

TECHNICAL FIELD

The present invention relates to a printing ink enabling high-speed printing of letters, figures, symbols, graphics, etc., having a thickness of 0.2 mm or more without having an effect on the printed base material. In addition, the present invention relates to a printed matter obtained using this printing ink, a printing method for printing using this printing ink, and a printer suitable for use when printing using this printing ink.

BACKGROUND ART

Embossing, in which a specific location of a base material is mechanically deformed by pressing from the back to the front, is known as one technology used to form letters, figures, symbols, graphics, etc., having a thickness of 0.2 mm or more, such as Braille characters for persons with vision or hearing disabilities, card numbers and names, on the surface of cards and other base materials.

However, in the case of technology in which letters and so forth having a thickness of 0.2 mm or more are formed by embossing, since it is necessary to mechanically deform the base material, together with there being restrictions on the material of the base material used, there is the risk of damaging the base material when performing embossing. In addition, although so-called IC cards containing internal IC, wiring patterns and so forth have been developed in recent years, in the case of performing embossing on base materials like these, there is the risk of causing disconnection of the IC, wiring patterns and so forth contained within.

Therefore, thick film printing by screen printing has been employed in the past as a method for obtaining letters and so forth having a thickness of 0.2 mm or more without placing restrictions on the base materials used and without having an effect on the base material. In addition, thick film printing using an ink jet system has also been proposed in recent years.

In the case of screen printing, however, the upper limit on the film thickness that can be printed in a single printing is several micrometers to several tens of micrometers, thereby resulting in the problem of being unable to obtain a thick film of 0.2 mm or more unless printing is repeated several times.

In addition, as an example of thick film printing using an ink jet system, Japanese Unexamined Patent Application, First Publication No. 2000-37943 discloses a method for performing thick film printing by an ink jet system using an ultraviolet curable ink having a surface tension greater than or equal to the wetting index of the printed base material. However, in the case of the method disclosed in Japanese Unexamined Patent Application, First Publication No. 2000-37943, it is difficult to obtain a stable thick film of the desired shape as a result of the shape of the coated ink being affected depending on the wetting index of the surface of the printed base material. In addition, in the case of thick film printing using an ink jet system, since it is difficult to discharge the ink unless the ink has a low viscosity as compared with screen printing, it is even more difficult to obtain a thick film.

In addition, since the photo-curable ink for thick film printing used in conventional thick film printing is required to be cured using an intense ultraviolet light source such as a mercury lamp, there is the risk of the base material being damaged by the ultraviolet light and heat. In addition, since ultraviolet radiation units using an intense ultraviolet light source such as a mercury lamp are large, a portable, compact printer for thick film printing has not been developed.

DISCLOSURE OF THE INVENTION

Therefore, in consideration of the above circumstances, an object of the present invention is to provide a printing ink that enables high-speed thick film printing without having an effect on a printed base material. In addition, an object of the present invention is to provide a printed matter obtained using this printing ink, a printing method for printing using this printing ink, and a compact printer suitable for use when printing using this printing ink.

The inventors of the present invention conducted studies by focusing on the points described below in order to solve these problems.

Although it is possible to print inks having a wide range of viscosity by using a dispenser, the speed of thick film printing cannot be increased simply by focusing on ink viscosity alone. That is, although the film thickness that can be formed in a single printing can be increased the higher the viscosity of the ink, the increases in the viscosity of the ink causes a decrease in the ink discharge rate, as a result of which the problem of slower printing speed occurs.

Therefore, in order to obtain a thick film in a single printing without causing the decrease in the ink discharge rate, the inventors of the present invention found that an ink is suitable in which, together with the viscosity decreasing during ink discharge, the viscosity increases after printing onto the surface of a print ed base material, namely, a thixotropic ink in which the viscosity decreases by applying shear stress (shearing stress) and increases by allowing to stand undisturbed following the application of the shear stress.

Moreover, the inventors of the present invention also found that, even in the case of the thixotropic ink, depending on the viscosity immediately after discharge and the degree of the thixotropy, it is difficult to obtain a thick film having a satisfactory shape in a single printing without lowering the ink discharge rate.

That is, it was found that, even in the case of the thixotropic ink, the increase in the viscosity after being discharged onto the printed base material is small in the case of the ink in which the viscosity immediately after discharge and the thixotropy are somewhat low, and as a result, the ink spreads excessively to the surrounding area after being discharged onto the printed base material, thereby making it difficult to obtain a thickness of 0.2 mm or more.

Conversely, it was also found that, since the increase in the viscosity immediately after discharge is remarkably high in the case of the ink having somewhat high thixotropy, together with the ink discharge rate decreasing to an extent to which it is no longer practical, the ink does not spread after being discharged onto the printed base material and the ends become pointed, thereby making it difficult to obtain a thick film of a desired shape.

Therefore, as a result of specifying viscoelastic characteristics, the inventors of the present invention discovered a printing ink as described below that enables the obtaining of a thick film of satisfactory shape having a thickness of 0.2 mm or more in a single printing without causing a decrease in the ink discharge rate, thereby leading to completion of the present invention.

The printing ink of the present invention is characterized by containing a photo-curable high polymer precursor and a photopolymerization initiator, and together with, at 25° C., the viscosity at a shear rate of 5 (1/s) being 8 to 75 (Pa·s), the viscosity at a shear rate of 20 (1/s) is 3 to 25 (Pa·s), and the thixotropic index value is 1.5 to 3.5.

In the present description, "thixotropic index value" is defined as the "ratio of viscosity at a shear rate of 5 (1/s) to viscosity at a shear rate of 20 (1/s)". Furthermore, the thixotropic index value is an indicator of thixotropy, and the larger this value, the greater the thixotropy.

The printing ink of the present invention has thixotropy such that the viscosity decreases the greater the shear stress that is applied (the larger the shear rate), and that the viscosity increases by allowing it to stand undisturbed following the application of the shear stress.

Moreover, the printing ink of the present invention is characterized by, at 25° C., having a viscosity of 8 to 75 (Pa·s) at a shear rate of 5 (1/s), a viscosity of 3 to 25 (Pa·s) at a shear rate of 20 (1/s), and a thixotropic index value of 1.5 to 3.5. By defining the viscosity relative to the shear rate and the thixotropic index value in this manner, the inventors of the present invention found that a thick film having a favorable shape and a thickness of 0.2 mm or more can be obtained in a single printing without causing a decrease in the ink discharge rate.

Furthermore, the inventors of the present invention also found that, in which, at 25° C., the viscosity at a shear rate of 5 (1/s), the viscosity at a shear rate of 20 (1/s), and the thixotropic index value are less than the lower limits defined above, there is a risk of being unable to obtain the desired thick film due to excessive spreading of the ink after being coated onto the surface of the printed base material.

On the other hand, in a case in which, at 25° C., the viscosity at a shear rate of 5 (1/s), the viscosity at a shear rate of 20 (1/s), and the thixotropic index value exceed the upper limits defined above, it was found that the ink discharge rate decreases to an extent to which it is no longer practical. In addition, in the case, at 25° C., the viscosity at a shear rate of 5 (1/s), the viscosity at a shear rate of 20 (1/s), and the thixotropic index value exceed the upper limits defined above, it was found that there is a risk of it becoming difficult to obtain a thick film of the desired shape due to the ink failing to spread after being discharged onto the surface of the printed base material resulting in the formation of sharp ends.

In addition, the inventors of the present invention also found that the thixotropic printing ink can be obtained by containing inorganic fine particles in a printing ink and then dispersing in the form of a colloid.

In the printing ink of the present invention, inorganic fine particles are thought to be uniformly dispersed in the state in which a plurality of fine particles are aggregated within a range over which they do not precipitate, and the thixotropy is thought to be expressed in which the viscosity of the ink decreases as a result of the aggregated inorganic fine particles mutually separating due to the application of the shear stress, while the viscosity increases as a result of a plurality of inorganic fine particles again aggregating due to the reduction or elimination of the shear stress after the shear stress has been applied.

In addition, it is preferable to use inorganic fine particles having a mean particle size of 0.1 μm or less. By using the microscopic inorganic fine particles having a mean particle size of 0.1 μm or less, even if a plurality of the inorganic fine particles aggregate, the entire aggregated inorganic fine particles do not become excessively large, thereby making it possible to prevent the inorganic fine particles from being non-uniformly dispersed or precipitating in the printing ink.

In addition, the inorganic fine particles are preferably contained at 3 to 8 parts by weight relative to 100 parts by weight of the high polymer precursor. It was found that, by setting the concentration of the inorganic fine particles in this manner, the printing ink of the present invention can be obtained having the viscoelastic characteristics described above.

Furthermore, the inventors of the present invention found that, if the concentration of the inorganic fine particles is less than 3 parts by weight, at 25° C., the viscosity at a shear rate of 5 (1/s), the viscosity at a shear rate of 20 (1/s), and the thixotropic index value become smaller than the previously defined lower limits. In addition, in the case in which the concentration of the inorganic fine particles exceeds 8 parts by weight, it was found that, at 25° C., the viscosity at a shear rate of 5 (1/s), the viscosity at a shear rate of 20 (1/s) and the thixotropic index value exceed the previously defined upper limits.

Furthermore, in the case of using a plurality of types of the high polymer precursors, the statement "inorganic fine particles are contained at 3 to 8 parts by weight in 100 parts by weight of the high polymer precursor" means that "inorganic fine particles are contained at 3 to 8 parts by weight relative to 100 parts by weight defined as the total blended amount of all high polymer precursors."

In addition, it is preferable that the printing ink of the present invention transmits light after curing. The use of such a constitution makes it possible to prevent letters, figures, symbols, etc., printed on the surface of the printed base material prior to thick film printing from being obscured due to thick film printing.

The following printed matter and printing method of the present invention can be provided by using the printing ink of the present invention as described above.

The printed matter of the present invention is characterized by the printing ink containing a photo-curable high polymer precursor and a photopolymerization initiator, and at 25° C., having a viscosity of 8 to 75 (Pa·s) at a shear rate of 5 (1/s), a viscosity of 3 to 25 (Pa·s) at a shear rate of 20 (1/s), and a thixotropic index value of 1.5 to 3.5, being printed on the surface of a printed base material followed by curing.

In addition, the printing ink preferably contains inorganic fine particles. Here, the printing ink preferably further contains 3 to 8 parts by weight of inorganic fine particles relative to 100 parts by weight of the high polymer precursor. In addition, the mean particle size of the inorganic fine particles is preferably 0.1 μm or less. In addition, the inorganic fine particles are preferably dispersed in the printing ink in the form of a colloid. In addition, the printing ink preferably transmits light after curing.

The present invention is particularly preferable for obtaining Braille printed matter, and by printing the printing ink of the present invention on the surface of the printed base material in the form of dots followed by curing, Braille printed matter can be provided in which Braille characters are printed on the surface.

In addition, by printing the printing ink of the present invention on the surface of the printed base material in the form of letters, figures or symbols followed by curing, a printed matter can be provided in which names, figures and so forth having a thickness of 0.2 mm or more are printed on the surface of a printed base material.

Although any material or shape may be used for the printed base material, cards imprinted with names, card numbers, etc., for example, are preferable. In addition, the present invention is also particularly preferable in the case of using for the printed base material cards such as IC cards for which there is the risk of disconnection of internal IC or wiring patterns when subjected to embossing.

In addition, the printing method of the present invention is characterized by having a step of printing the printing ink of the present invention onto the surface of the printed base material using a dispenser and a step of curing the printing ink printed onto the surface of the printed base material by exposing to light.

Moreover, the inventors of the present invention invented a portable, compact printer suitably used when performing thick film printing using the printing ink of the present invention.

The printer of the present invention is characterized by being provided with an ink discharge unit having a discharge port that discharges a photo-curable printing ink, a base material holding unit that holds a printed base material, a position control unit capable of arranging in opposition at a prescribed interval the discharge port of the ink discharge unit and a prescribed position on the surface of the printed base material held by the base material holding unit, and a light emitting unit that cures the printing ink by emitting light onto the printing ink discharged from the ink discharge unit onto the surface of the printed base material, wherein the ink discharge unit, the base material holding unit, the position control unit and the light emitting unit are all contained in a single rack.

In addition, in the printer of the present invention, the ink discharge unit is characterized by containing a dispenser having an ink cylinder filled with the printing ink inside.

In addition, the light emitting unit is characterized by being able to radiate ultraviolet light of 1500 to 5000 $\mu W/cm^2$.

In the case of conventional thick film printing, since an intense ultraviolet light source such as a mercury lamp was used, a printer containing a built-in light emitting unit has yet to be developed. In contrast, in the case of the present invention, since the ink that is used can be cured with ultraviolet light of low intensity, by composing the light emitting unit using a compact ultraviolet light source capable of emitting ultraviolet light of low intensity of 1500 to 5000 $\mu W/cm^2$, a portable, compact printer is realized in which the ink discharge unit, the base material holding unit, the position control unit, and the light emitting unit are all contained in a single rack.

In addition, by composing the light radiation unit using an ultraviolet light source capable of emitting ultraviolet light of low intensity of 1500 to 5000 $\mu W/cm^2$, damage to the printed base material caused by ultraviolet light and heat can be reduced.

The printer of the present invention is preferably used when performing thick film printing using the printing ink of the present invention. However, since the dispenser is capable of discharging inks having a wide range of the viscosity, and various other means (such as an ink jet system) other than a dispenser can be employed for the ink discharge unit, the printer of the present invention can be applied even in the case of performing printing using various inks other than the printing ink of the present invention.

BEST MODE FOR CARRYING OUT THE INVENTION

Figure 1:
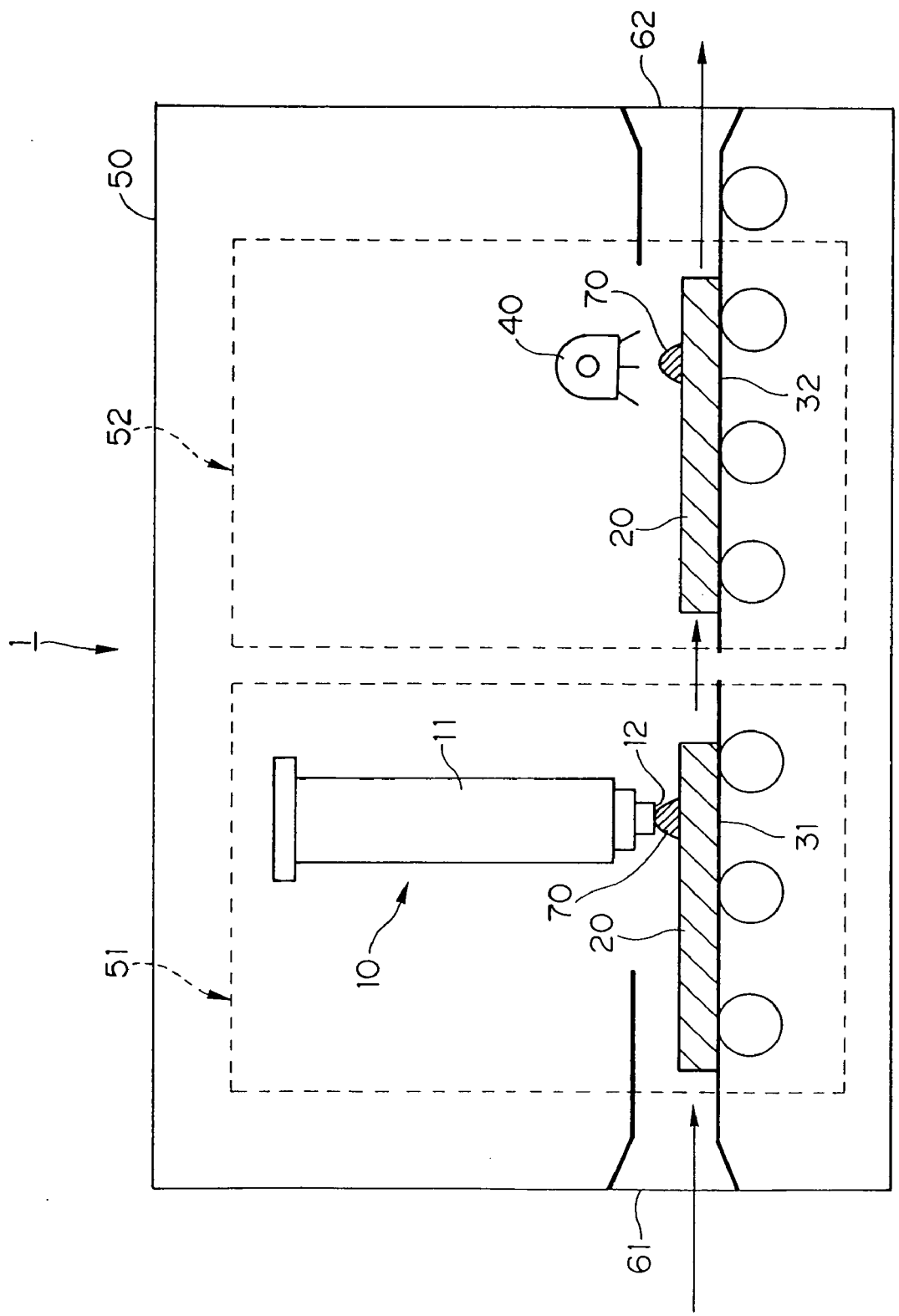
FIG. 1 is a schematic cross-sectional view showing the structure of a printer of one embodiment according to the present invention.

The following provides a detailed explanation of the present invention.

Printing Ink

First, an explanation is provided of a printing ink of the present invention.

The printing ink of the present invention is characterized by containing a photo-curable high polymer precursor, a photopolymerization initiator and inorganic fine particles at a prescribed concentration, and at 25° C., the viscosity at a shear rate of 5 (1/s) being 8 to 75 (Pa·s), the viscosity at a shear rate of 20 (1/s) being 3 to 25 (Pa·s), and the thixotropic index value being 1.5 to 3.5. In addition, the inorganic fine particles are dispersed in the printing ink of the present invention in the form of a colloid.

As a result of employing the above constitution, a thick film of a satisfactory shape of 0.2 mm or more can be obtained in a single printing without decreasing the discharge rate of the ink.

Furthermore, in the case, at 25° C., the viscosity at a shear rate of 5 (1/s), the viscosity at a shear rate of 20 (1/s), and the thixotropic index value are smaller than the lower limits defined above, there is the risk of it becoming difficult to obtain the desired thick film due to the ink spreading excessively after being coated onto the surface of a printed base material.

On the other hand, in the case in which, at 25° C., the viscosity at a shear rate of 5 (1/s), the viscosity at a shear rate of 20 (1/s), and the thixotropic index value exceed the upper limits defined above, the discharge rate of the ink decreases to an extent to which it is no longer practical. In addition, in the case in which, at 25° C., the viscosity at a shear rate of 5 (1/s), the viscosity at a shear rate of 20 (1/s), and the thixotropic index value exceed the upper limits defined above, the ink does not spread after being discharged onto the printed base material and the ends become pointed, thereby resulting in the risk of it becoming difficult to obtain a thick film of a desired shape.

In the printing ink of the present invention described above, a photo-curable high polymer precursor refers to a "photo-curable monomer" or a "photo-curable prepolymer for which the degree of polymerization of a photo-curable oligomer and so forth is low and which is polymerized due to the progression of a curing reaction", and one type or a plurality of types of known photo-curable monomers or prepolymers can be used.

Examples of the photo-curable monomers include urethane-based acrylate monomers, ester-based acrylate monomers, and epoxy-based acrylate monomers. Examples of photo-curable prepolymers include urethane-based acrylate prepolymers, ester-based acrylate prepolymers, and epoxy-based acrylate prepolymers.

Examples of photopolymerization initiators include acetophenone, 2,2-diethoxyacetophenone, p-dimethylaminoacetophenone, p-dimethylaminopropiophenone, benzophenone, 2-chlorobenzophenone, pp'-dichlorobenzophenone, pp'-bisdiethylaminobenzophenone, Michler's ketone, benzyl, benzoin, benzoinmethylether, benzoinethylether, benzoinisopropylether, benzoin-n-propylether, benzoinisobutylether, benzoin-n-butylether, benzyldimethylketal, tetramethylthiorammonosulfide, thioxansone, 2-chlorothioxanzone, 2-methylthioxansone, azobisisobutyronitrile, benzoinperoxide, di-t-butylperoxide, 1-hydroxycyclohexylphenylketone, 2-hydroxy-2-methyl-1-phenyl-1-one, 1-(4-isopropylphenyl)-2-hydroxy-2-methylpropane-1-one, methylbenzoylformate and 2-methyl-1[4-(methylthio)phenyl]-2-morpholinopropane-1-one.

In addition, inorganic fine particles of any materials may be used for the inorganic fine particles, examples of which include one or a plurality of types of inorganic fine particles containing carbon black, aluminum oxide, iron oxide or silicon oxide.

The mean particle size of the inorganic fine particles is preferably 0.1 µm or less. By using microscopic inorganic fine particles having a small mean particle size like this, even if a plurality of inorganic fine particles aggregate, the entire aggregated inorganic fine particles do not become excessively large, thereby making it possible to prevent the inorganic fine particles from being non-uniformly dispersed or precipitating in the printing ink.

In addition, inorganic fine particles are preferably contained at 3 to 8 parts by weight relative to 100 parts by weight of the high polymer precursor. By blending the inorganic fine particles in this manner, the printing ink of the present invention can be provided that has the viscoelastic characteristics described above.

In addition, it is preferable that the printing ink of the present invention transmits light after curing, and it is particularly preferable that it be transparent after curing. As a result of composing in this manner, it is possible to prevent letters, figures, symbols, etc., printed on the surface of the printed base material prior to thick film printing from becoming illegible due to thick film printing.

In addition, the printing ink of the present invention may be blended with various additives such as curing accelerators, pigments, dyes, resins, salts or acids in addition to those previously described. In particular, it is desirable to blend a curing accelerator such as a benzyldimethylketal-based sensitizer to enable curing even with light of low intensity.

Printed Matter

A printed matter on which are printed letters, figures, symbols, graphics, etc., having a thickness of 0.2 mm or more can be provided by printing the printing ink of the present invention described above in a prescribed shape on the surface of a printed base material using a dispenser, followed by curing by irradiating with light.

The present invention is particularly suitable for obtaining a Braille printed matter, and the Braille printed matter in which Braille characters are printed on a surface can be provided by printing the printing ink of the present invention on the surface of a printed base material in the form of dots followed by curing.

In addition, a printed matter in which names, figures and so forth having a thickness of 0.2 mm or more are printed on the surface of the printed base material can be provided by printing the printing ink of the present invention onto the surface of the printed base material in the form of letters, figures or symbols followed by curing.

Base materials of any materials can be used for the printed base material, examples of which include paper, plastic, glass, metal; ceramics, wood or composite materials thereof.

In addition, although any form of the printed base material may be used, cards on which names, card numbers, etc., are printed, for example, are preferable as a printed base material. In addition, the present invention is particularly preferable in the case of using cards in the form of IC cards in particular, for which embossing has the risk of causing disconnection of internal IC and wiring patterns, for the printed base material.

In addition, although the light that is emitted for curing the printing ink specifically refers to an ultraviolet light, an electron beam, etc., the light is not limited to these.

Printer

Next, an explanation is provided for the preferable structure of the printer of the present invention that is used when performing thick film printing using the previously described printing ink of the present invention.

FIG. 1 shows a schematic cross-sectional view of a printer of one embodiment as claimed in the present invention, and explains the structure of this printer along with the method by which printing is performed using this printer. In the present embodiment, the explanation uses an example of a printer capable of printing Braille characters. Furthermore, the printer shown in FIG. 1 is only one example of such a printer, and the present invention is not limited to this.

A printing section 51, which prints the photo-curable printing ink onto the surface of a printed base material 20, and a curing section 52, which cures the printing ink that has been printed onto the surface of the printed base material 20, are provided within a printer 1. This printing section 51 is provided with an ink discharge unit 10, and a first base material holding unit 31 that holds the printed base material 20, while the curing section 52 is provided with a light emitting unit 40 and a second base material holding unit 32 that holds the printed base material 20.

In addition, in the printer 1 of the present embodiment, the ink discharge unit 10, the first base material holding unit 31, a position control unit to be described later, the light emitting unit 40 and the second base material holding unit 32 are all contained in a single rack 50.

A printed base material insertion port 61, which supplies the printed base material 20 to the inside of the printer 1, is provided at the left end as shown in the drawing of the rack 50, and the printed base material 20 inserted from this printed base material insertion port 61 is led to a printing section 51 by being transported in a state in which it is held by the first base material holding unit 31.

The ink discharge unit 10 is composed of a dispenser, and is roughly composed of an ink cylinder 11 in which the printing ink is filled inside, and a discharge port 12 from which the printing ink is discharged. In addition, the ink discharge unit 10 is connected to a position control unit (not shown). A structure is employed that allows the ink discharge unit 10 to be moved three-dimensionally and arranged at a prescribed location by the position control unit.

In the printing section 51, the position of the ink discharge unit 10 is set by the position control unit in the state in which the printed base material 20 is held by the first base material holding unit 31. At this time, the position of the ink discharge unit 10 is set so that a prescribed location on the surface of the printed base material 20 is arranged in opposition to the discharge port 12 of the ink discharge unit 10 while separated by a prescribed interval. Next, printing is carried out by discharging the printing ink onto the prescribed location on the surface of the printed base material 20 from the ink discharge unit 10.

A mechanism that causes the printing ink to be discharged by applying pneumatic pressure to printing ink filled in the ink cylinder 11 can be employed for the mechanism by which a prescribed amount of the printing ink is discharged from the ink discharge unit 10.

After repeatedly adjusting the position of the ink discharge unit 10 and printing for all locations at which printing is to be carried out on the surface of the printed base material 20, printed base material 20 is transported to the curing section 52. Furthermore, in FIG. 1, the printing ink printed onto the surface of the printed base material 20 is indicated by reference numeral 70.

The printed base material 20 that has been transported to the curing section 52 is held by the second base material holding unit 32, and the printing ink 70 printed with the printing section 51 is cured. Curing of the printing ink 70 is carried out by emitting light onto the printing ink 70 printed onto the surface of the printed base material 20 from the light emitting unit 40 provided at a prescribed location within the curing section 52. Curing of the printing ink 70 may also be carried out by transporting the printed base material 20 from left to right as shown in the drawing or by maintaining the printed base material 20 in a stationary state.

In the printer 1 of the present embodiment, the light emitting unit 40 is preferably composed of an ultraviolet light source capable of emitting ultraviolet light having an intensity of 1500 to 5000 $\mu W/cm^2$. By using the light source capable of emitting ultraviolet light of low intensity as compared with a mercury, etc., in this manner, in addition to being able to reduce damages to the printed base material 20 caused by ultraviolet light and heat, the ultraviolet radiation unit can be made to be more compact. As a result, the portable, compact printer 1 can be provided in which the ink discharge unit 10, the first base material holding unit 31, the position control unit, the light emitting unit 40 and the second base material holding unit 32 can all be contained within the single rack 50.

Following completion of curing of the printing ink 70, the printed base material 20 is transported by the second base material holding unit 32 and is ejected by being discharged from a printed base material ejection port 62 provided in the right end as shown in the drawing of the rack 50.

In addition, in the printer 1 of the present embodiment, light such as ultraviolet light capable of curing the printing ink is blocked in the printing section 51. As a result of employing this type of constitution, together with being able to prevent the printing ink from being cured from the time the printing ink is discharged from the ink discharge unit 10 until it reaches the printed base material 20, deterioration of the printing ink contained within the ink discharge unit 10 can also be prevented.

Furthermore, although an explanation has only been provided for the printer capable of printing Braille characters in the present embodiment, the present invention is not limited to this, but rather, can also be applied to cases of printing all shapes of letters, figures, symbols, graphics, etc.

For example, in the case of printing letters, figures, symbols, etc., various shapes of thick films, such as letters, figures and symbols, can be printed by using an ink discharge unit similar to that of the present embodiment, and relatively moving the printed base material two-dimensionally while continuously discharging the ink from the ink discharge unit in the state in which the discharge port of the ink discharge unit and the surface of the printed base material are held separated by a prescribed interval.

In addition, in the present embodiment, although a constitution is employed in which a prescribed location on the surface of the printed base material 20 and the discharge port 12 of the ink discharge unit 10 are arranged in opposition separated by a prescribed interval by controlling the position of the ink discharge unit 10 with the position control unit, the present invention is not limited to such a constitution. Instead, a constitution may be employed in which the position of the ink discharge unit 10 is fixed, while the position of the printed base material 20 can be controlled with the position control unit.

In addition, although the present embodiment employed a constitution in which the printed base material 20 is transported to the curing section 52 where the printing ink is cured after the printing ink was printed at all locations desired to be printed on the surface of the printed base material 20, the present invention is not limited to such a constitution. Instead, printing with the printing section 51 and curing with the curing section 52 may be repeatedly carried out alternately with respect to the single printed base material 20 by, for example, first printing one or a plurality of locations among the locations desired to be printed on the printed base material 20, transporting the printed base material 20 to the curing section 52 for curing, and then again returning printed base material 20 to printing section 51 where other locations are then printed.

In addition, in the case of desiring to print multiple types of the printing ink having different colors, etc., printing may be carried out using the single ink discharge unit 10 while changing the printing ink filled inside, or printing may be carried out using a plurality of the ink discharge units 10 and filling with each different type of the printing ink.

In addition, although the printing section 51 and the curing section 52 are composed separately in the present embodiment, the present invention is not limited to this, but rather the printing section and the curing section may be also be composed within the same space. For example, a constitution may be employed in which the light emitting unit is arranged near the ink discharge unit, light is not emitted from the light emitting unit when printing with the ink discharge unit, while the light emitting unit is turned on following printing with the ink discharge unit to cure the printed ink.

In addition, the printer of the present invention is preferably used when carrying out thick film printing using the printing ink of the present invention. However, since the dispenser is able to discharge inks having a broad range of the viscosities, and various units other than a dispenser can be used for the ink discharge unit (such as an ink jet system), the printer of the present invention can also be applied to cases of carrying out printing using various inks other than the printing ink of the present invention.

EXAMPLES

The following provides an explanation of embodiments of the present invention.

(Printing Ink Composition)

In Examples 1 through 6, printing inks were prepared by using urethane-based acrylate monomer and urethane-based acrylate prepolymer for the photo-curable high polymer precursor, 2-methyl-1-[4-(methylthio)phenyl]-2-morpholino-propane-1-one (Nagase Industries, trade name: "Irgacure 907") for the photopolymerization initiator, a benzyldimethylketal-based sensitizer for the curing accelerator, and silicon oxide fine particles having a mean particle size of 0.02 µm for the inorganic fine particles.

In Examples 1 through 6, printing inks were prepared by using the same blending ratios for the urethane-based acrylate monomer, urethane-based acrylate prepolymer, photopolymerization initiator, and curing accelerator while changing only the concentration of the inorganic fine particles.

The compositions of each printing ink prepared in Examples 1 through 6 are shown in Table 1.

As shown in Table 1, in Examples 1 through 6, printing inks were prepared by blending 55 parts by weight of urethane-based acrylate monomer and 45 parts by weight of urethane-based acrylate prepolymer, followed by adding the inorganic fine particles while changing the amount added within the range from 3.5 to 7.0 parts by weight with respect to 100 parts by weight of the high polymer precursor containing urethane-based acrylate monomer and urethane-based acrylate prepolymer. In addition, in Examples 1 through 6, 5 parts by weight of the benzyldimethylketal-based sensitizer and 10 parts by weight of the photopolymerization initiator were blended with respect to 100 parts by weight of the high polymer precursor.

(Viscoelastic Characteristics of Printing Ink)

In Examples 1 through 6, the viscoelastic characteristics of each printing ink obtained were measured using the Haake Model RS100 rheometer. A setting of C35/1° was used for the sensor system and the measurement temperature was 25° C.

The viscosity was measured continuously using the rheometer while changing shear rate. After holding for 60 seconds at a shear rate of 10 (1/s), the printing ink was allowed to stand undisturbed for 120 seconds without applying shear stress. Next, the viscosity was measured by continuously increasing the shear stress from 0.1 Pa to 890.5 Pa over the course of 180 seconds, and then after allowing to stand for 30 seconds at a shear rate of 890.5 Pa, the viscosity was again measured by continuously decreasing the shear stress from 890.5 Pa to 0.1 Pa over the course of 120 seconds.

Figure 2:
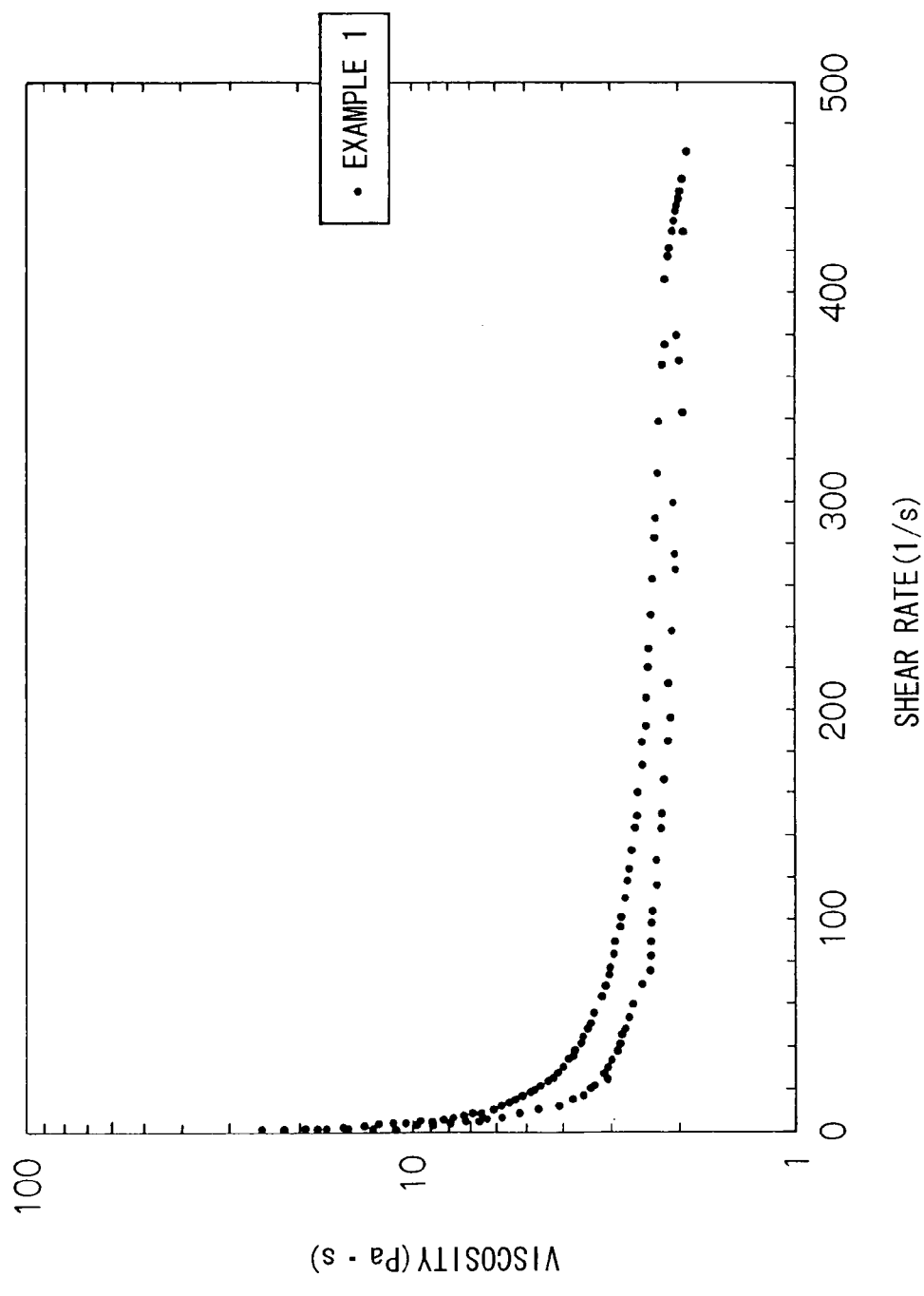
FIG. 2 is a graph showing the relationship between the shear rate and the viscosity for a printing ink obtain in Embodiment 1 according to the present invention.

The relationship between the shear rate and the viscosity of the printing ink obtained in Example 1 is shown in FIG. 2. Furthermore, in FIG. 2, the upper data in the graph indicates the data obtained when the shear rate was increased, while the lower data in the graph indicates the data obtained when the shear rate was decreased.

As shown in FIG. 2, the printing ink obtained in Example 1 was determined to decrease in the viscosity accompanying an increase in the shear rate. Moreover, after the shear rate was increased, it was determined to exhibit viscoelastic characteristics nearly identical to those in the case of increasing the shear rate even when the shear rate was decreased.

In addition, results similar to those of Example 1 were obtained in Examples 2 through 6.

Figure 3:
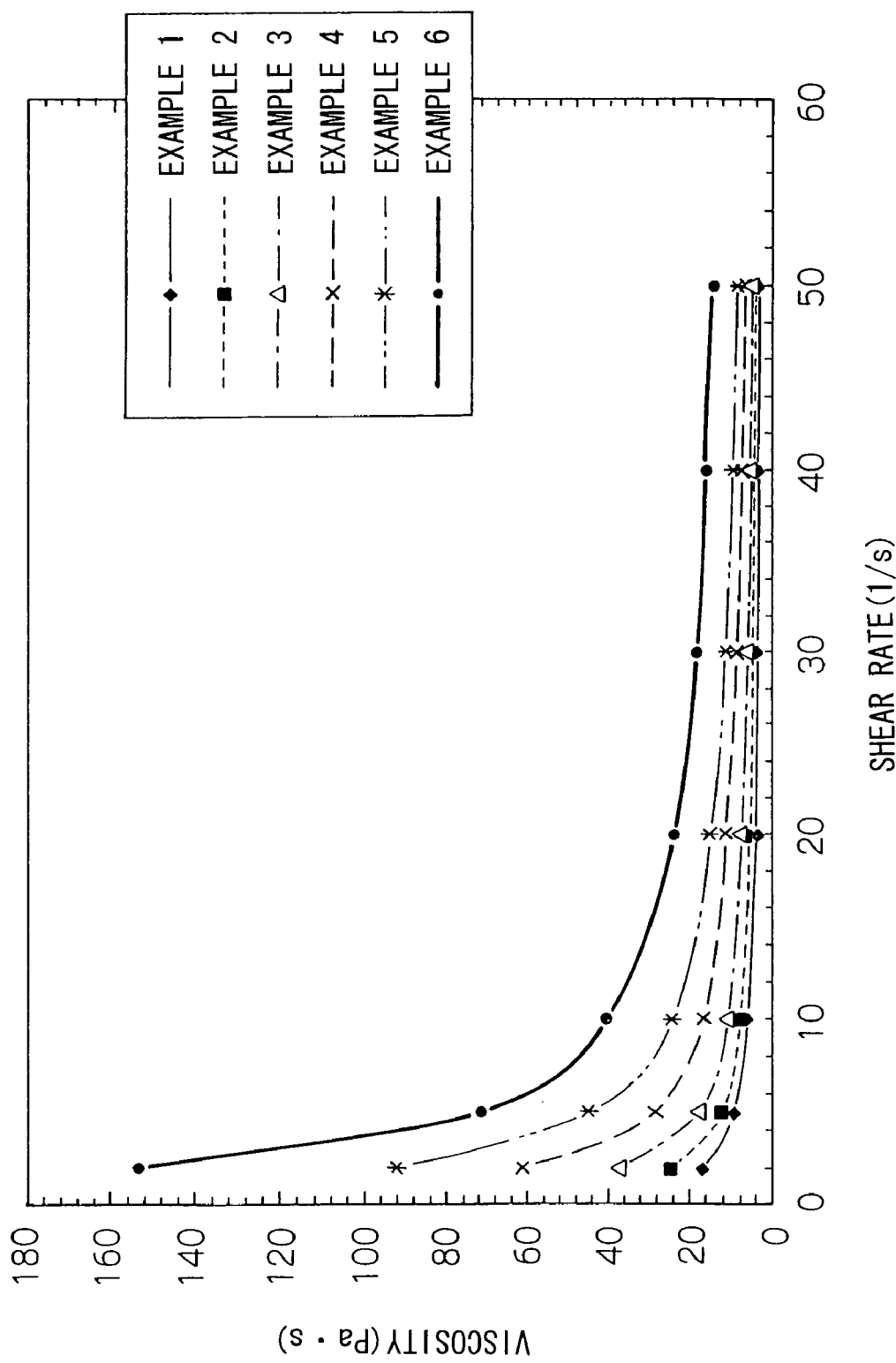
FIG. 3 is a graph showing the relationship between the shear rate and the viscosity for various printing inks obtained in Examples 1 through 6 according to the present invention.

Therefore, in order to compare the viscoelastic characteristics of each printing ink obtained in Examples 1 through 6, only the results of measuring the viscosity when the shear rate was changed from 0 (1/s) to 50 (1/s) were extracted and shown in FIG. 3. In addition, in Examples 1 through 6, the viscosities of the resulting printing inks at shear rates of 5 (1/s) and 20 (1/s) are respectively shown in Table 2. In addition, the thixotropic index values (TI values) were calculated from the results obtained and also shown in Table 2. Furthermore, in Table 2, the "viscosity at a shear rate of 5 (1/s)" and "viscosity at a shear rate of 20 (1/s)" are respectively abbreviated as the "viscosity at 5 (1/s)" and "viscosity at 20 (1/s)".

As shown in FIG. 3, Table 1 and Table 2, it was determined that as the blended amount of inorganic fine particles was increased from 3.5 parts by weight to 7.0 parts by weight, in addition to the viscosity increasing when the shear rate was small, the rate of the decrease in the viscosity increased when the shear stress was applied, while the thixotropy became higher as the blended amount of the inorganic fine particles was increased.

More specifically, as shown in Tables 1 and 2, as a result of changing the concentration of the inorganic fine particles from 3.5 parts by weight to 7.0 parts by weight, it was determined that the viscosity at a shear rate of 5 (1/s) was able to be changed from 9.4 (Pa·s) to 71.2 (Pa·s), while the viscosity at a shear rate of 20 (1/s) was able to be changed from 4.65 (Pa·s) to 23.6 (Pa·s). In addition, as a result of changing the concentration of inorganic fine particles from 3.5 parts by weight to 7.0 parts by weight, it was determined that the thixotropic index value was able to be changed from 2.02 to 3.02.

(Printing Characteristics of Printing Ink)

Next, Braille characters were printed using the printer explained in the previously described Example using each of the printing inks obtained in Examples 1 through 6 followed by evaluation of printing characteristics.

Braille characters were printed by using an air dispenser for the ink discharge unit, setting the inner diameter of the discharge port to 0.3 mm, the discharge air pressure to 0.3 MPa, and setting the interval between the discharge port of the ink discharge unit and the surface of the printed base material to 0.6 mm. In addition, a fluorescent tube capable of emitting ultraviolet light of 365 nm at an intensity of 800 μm/cm$^2$ was used for the light emitting unit, while a vinyl chloride card was used for the printed base material.

In addition, in Examples 1 through 6, the amount of time required to print one Braille character (amount of time required to discharge one drop of ink) was measured as the discharge time. In addition, the height of the resulting Braille characters was measured after irradiating the characters for 3 minutes with ultraviolet light of 365 nm at an intensity of 800 μm/cm$^2$ 120 seconds after printing, and curing the ink printed on the printed base material.

The discharge times and height of the formed characters of each of the printing inks obtained in Examples 1 through 6 are shown in Table 2.

As shown in Table 2, in Examples 1 through 6, all discharge times were from 0.3 to 2.0 (sec), indicating that ink droplets were able to be discharged in a short time, and Braille characters were able to be formed having a thickness of 0.3 mm or more. In Examples 2 and 3 in particular in which the blended amounts of the inorganic fine particles were 4 to 4.5 parts per weight, the shape of the dots was roughly hemispherical, and Braille characters were able to be formed that were aesthetically superior.

Furthermore, although only the case of using vinyl chloride cards for the printed base material is explained in Examples 1 through 6, the inventor of the present invention has confirmed that similar results are also obtained in the case of using cards made of PET-G or ABS (acrylonitrile-butadiene-styrene copolymer) resin, etc.

In addition, although only the case of using silicon oxide fine particles having a mean particle size of 0.02 μm is explained in Examples 1 through 6, the inventor of the present invention has confirmed that similar results are also obtained in the case of using carbon black fine particles, aluminum oxide fine particles, iron oxide fine particles or silicon oxide fine particles having a mean particle size of 0.1 μm or less.

In addition, the inventor of the present invention has also confirmed that, in the case the concentration of inorganic fine particles is less than 3 parts by weight, the printing ink spreads excessively immediately after being printed on the surface of the printed base material, and dots having a thickness of 0.2 mm or more cannot be formed. In addition, it has also been confirmed that in the case in which inorganic fine powder is blended in an amount greater than 8 parts by weight, the discharge time required to discharge one drop of ink increases to 2.5 seconds or more, and together with lowering the ink discharge rate to a degree that prevents it from being used practically, makes it difficult to obtain characters of a desired shape due to the formation of sharp ends as a result of the ink failing to spread after being discharged onto the surface of the printed base material.

TABLE 1

Ink Composition

| | Monomer (parts by weight) | Prepolymer (parts by weight) | Inorganic fine particles (parts by weight) | Photo-polymerization initiator (parts by weight) | Sensitizer (parts by weight) |
|---|---|---|---|---|---|
| Example. 1 | 55 | 45 | 3.5 | 10 | 5 |
| Example. 2 | 55 | 45 | 4.0 | 10 | 5 |
| Example. 3 | 55 | 45 | 4.5 | 10 | 5 |
| Example. 4 | 55 | 45 | 5.0 | 10 | 5 |
| Example. 5 | 55 | 45 | 6.0 | 10 | 5 |
| Example. 6 | 55 | 45 | 7.0 | 10 | 5 |

TABLE 2

| | Viscoelastic Characteristics | | | Printing Characteristics | |
|---|---|---|---|---|---|
| | Viscosity at 5 (1/s) (Pa · s) | Viscosity at 20 (1/s) (Pa · s) | TI value (−) | Discharge time (sec) | Character height (mm) |
| Example. 1 | 9.4 | 4.65 | 2.02 | 0.3 | 0.38 |
| Example. 2 | 12.5 | 5.8 | 2.16 | 0.5 | 0.45 |
| Example. 3 | 17.8 | 7.4 | 2.4 | 0.6 | 0.56 |
| Example. 4 | 28.2 | 10.7 | 2.64 | 0.9 | 0.67 |
| Example. 5 | 44.6 | 15.0 | 2.97 | 1.5 | 0.82 |
| Example. 6 | 71.2 | 23.6 | 3.02 | 2.0 | 0.91 |

INDUSTRIAL APPLICABILITY

According to the present invention, a printing ink can be provided that allows the obtaining of a thick film of 0.2 mm or more in a single printing without causing a decrease in the discharge rate of the ink. According to the printing ink of the present invention, since printing can be carried out without causing a decrease in the discharge rate of the ink and repeated printing is not required, a thick film can be printed rapidly.

In addition, according to the printing ink of the present invention, since it is not necessary to mechanically deform the printed base material such as by performing embossing, thick film printing can be carried out without affecting the printed base material.

In addition, according to the present invention, the printed matter obtained using the printing ink of the present invention, the printing method for carrying out printing using the printing ink of the present invention, and the portable, compact printer suitably used when performing thick film printing using the printing ink of the present invention, can be provided.

Furthermore, the present invention can be carried out in various other forms without deviating from its main characteristics. The previously described Examples are simply examples, and should not be interpreted as limiting the present invention. In addition, the scope of the present invention is indicated by the claims, and is not restricted in any way by the description text. In addition, variations and modifications belonging to the overall scope of claims are all included within the scope of the present invention.

The invention claimed is:

1. A printing ink, consisting essentially of:
   a photo-curable high polymer precursor, a photopolymerization initiator, and inorganic fine particles,
   wherein at 25° C.,
     the viscosity at a shear rate of 5 (1/s) is 8 to 75 (Pa·s), the viscosity at a shear rate of 20 (1/s) is 3 to 25 (Pa·s), and the thixotropic index value is 1.5 to 3.5,
     the inorganic fine particles are contained at 3 to 8 parts by weight relative to 100 parts by weight of the high polymer precursor and are dispersed in the form of a colloid, and
     the mean particle size of the inorganic fine particles is 0.1 μm or less.

2. The printing ink according to claim 1, wherein the printing ink transmits light after curing.

3. A printed matter, comprising:
   a printed base material; and
   a printing ink according to claim 1, wherein
   the printing ink is printed on the surface of the printed base material and cured.

4. The printed matter according to claim 3, wherein the printing ink transmits light after curing.

5. The printed matter according to claim 3, wherein the printing ink is printed on the printed base material in a shape of a letter, a figure, or a symbol, and cured.

6. The printed matter according to claim 3, wherein the printed base material is a card.

7. The printed matter according to claim 6, wherein the printed base material is an IC card containing an internal IC and a wiring pattern.

8. A printing method comprising:
   printing the printing ink according to claim 1 onto a surface of a printed base material using a dispenser, and
   curing the printing ink printed onto the surface of the printed base material by exposing to light.

* * * * *